United States Patent [19]

Melara

[11] Patent Number: 5,014,392
[45] Date of Patent: May 14, 1991

[54] SELF-ORIENTATABLE TWIN WHEEL OF THE KIND COMPRISING A PAIR OF COAXIAL WHEELS

[75] Inventor: Francescantonio Melara, Bologna, Italy

[73] Assignee: Emilsider Meccanica S.p.A., Bologna, Italy

[21] Appl. No.: 482,108

[22] Filed: Feb. 20, 1990

[30] Foreign Application Priority Data

Feb. 28, 1989 [IT] Italy .................... 4751/89[U]

[51] Int. Cl.⁵ .............................. B60B 33/00
[52] U.S. Cl. .............................. 16/46; 16/47; 384/281; 384/296; 301/122
[58] Field of Search ................... 16/36–38, 16/45–47, 18 R; 301/111, 121, 122, 131; 384/281, 296

[56] References Cited

U.S. PATENT DOCUMENTS 4,544,425 10/1985 Provolo .................... 16/46

FOREIGN PATENT DOCUMENTS

| 287825 | 10/1988 | European Pat. Off. ............ 16/47 |
| 7432250 | 1/1975 | Fed. Rep. of Germany . |
| 2620076 | 9/1977 | Fed. Rep. of Germany ......... 16/36 |
| 2909495 | 4/1980 | Fed. Rep. of Germany ......... 16/47 |
| 861883 | 3/1961 | United Kingdom ................ 16/47 |
| 1299583 | 12/1972 | United Kingdom . |

Primary Examiner—Richard K. Seidel
Assistant Examiner—Edward A. Brown
Attorney, Agent, or Firm—Guido Modiano; Albert Josif

[57] ABSTRACT

A self-orientatable twin wheel which includes a support which supports a pivot upon which are mounted a pair of wheels. The pair of wheels are provided with hollow tangs into which the pivot is inserted. Bushes with inner and outer collars are interposed between the pivot and tangs. The inner and outer collars engage with grooves provided in the pivot and tangs.

11 Claims, 1 Drawing Sheet

SELF-ORIENTATABLE TWIN WHEEL OF THE KIND COMPRISING A PAIR OF COAXIAL WHEELS

BACKGROUND OF THE INVENTION

The present invention relates to a self-orientatable twin wheel of the kind comprising a pair of coaxial wheels.

So-called twin wheels are constituted by a pair of wheels rotatably mounted on a pivot. Said pviot is horizontally supported by a support which comprises a vertical wall, which extends between the wheels and is arranged in a perpendicular plane, and a sort of semi-cylindrical housing which upwardly covers the wheel. A sort of well is provided in said vertical wall which is open upward and acts as a rotation seat for a vertical self-orientation pivot intended to be inserted and fixed in a seat of the piece of furniture to which the wheel is to be applied.

Two tubular portions extend from both faces of the wall which are coaxial to the pivot and are internally provided with coupling elements for a collar which is externally provided on a hollow tang which is rigidly associated with the respective wheel. Said tang acts in practice as a bearing for the rotatable support of the wheel on the pivot.

Conventional twin wheels have substantial disadvantages related to the manufacturing method which comprise their adaptation to the "standards" set by safety rules. In particular, in order to increase wear resistance, it is known to manufacture the wheels entirely in polyamide resins, whereas copolymers (e.g. polypropylene loaded with rubber), which have greater elasticity characteristics, are usually adopted if greater shock-resistance is to be achieved.

In any case, wheels made of polyamide resins have an excessive cost due to the high cost of this material.

Polyamide resins are furthermore very hard, so that the wheels are excessively noisy in rolling.

The German utility model No. 74 32 250 discloses a wheel provided with a supporting bush on the pivot.

Said bush has no means which allow its retention on said pivot, so it is necessary to resort to an additional elastic ring which makes assembly more laborious.

The UK patent No. 1 299 583 discloses a wheel with a pivot which is rotatably supported in a bush made of plastic material and provided with means which allow to retain it on the pivot. However, in order to incorporate the retention means in the bush, since undercuts are involved, it is necessary to provide the bush in two specularly identical parts which tend to deform under load, thereby compromising the rotation of the pivot.

SUMMARY OF THE INVENTION

The technical aim of the present invention is to provide a twin wheel which obviates the disadvantages of known ones, i.e. is capable of offering wear resistance equal to that of polyamide resin wheels and shock-resistance equal to that of rubber-loaded polypropylene wheels.

Within the scope of this aim, an object of the present invention is to provide a twin wheel which produces less rolling noise.

This aim and this object are obtained with a twin wheel which is characterized in that the wheel and the hollow tang are made of shock-resistant material and in that a bush, made of wear-resistant material, for sliding on the pivot is inserted inside said hollow tang, said bushes having an external collar which is adjacent to an end of said bushes and an internal collar adjacent to the opposite end, said collars being adapted to engage in respective grooves of the supporting pivot and of the tubular portions and having a saw-tooth cross section with a front surface and an inclined surface, said front surfaces being directed toward the respective adjacent ends.

BRIEF DESCRIPTION OF THE DRAWINGS

Further details of the invention will become apparent from the following detailed description of a preferred embodiment, illustrated only by way of non-limitative example in the accompanying drawings, wherein.

DESCRIPTION OF THE PREFERRED EMBODIMENTS

Figure 2:
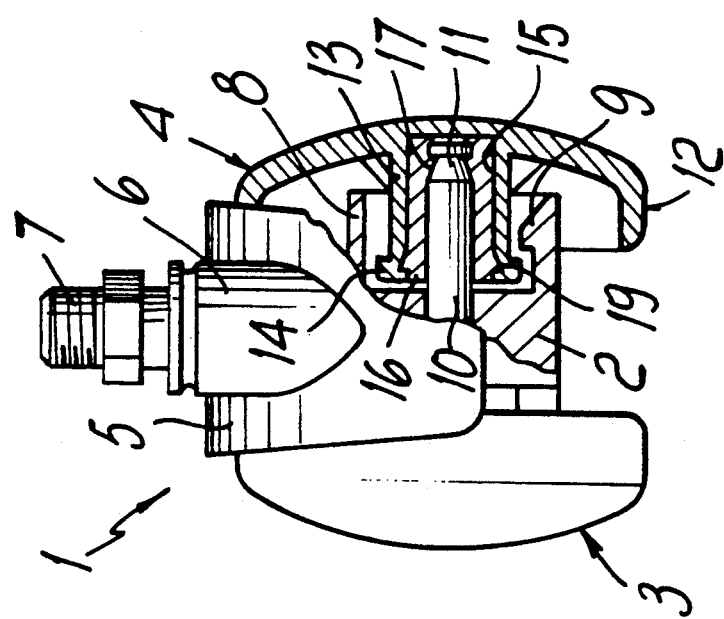
FIG. 2 is a partially sectional front view of the wheel of FIG. 1.
Figure 1:
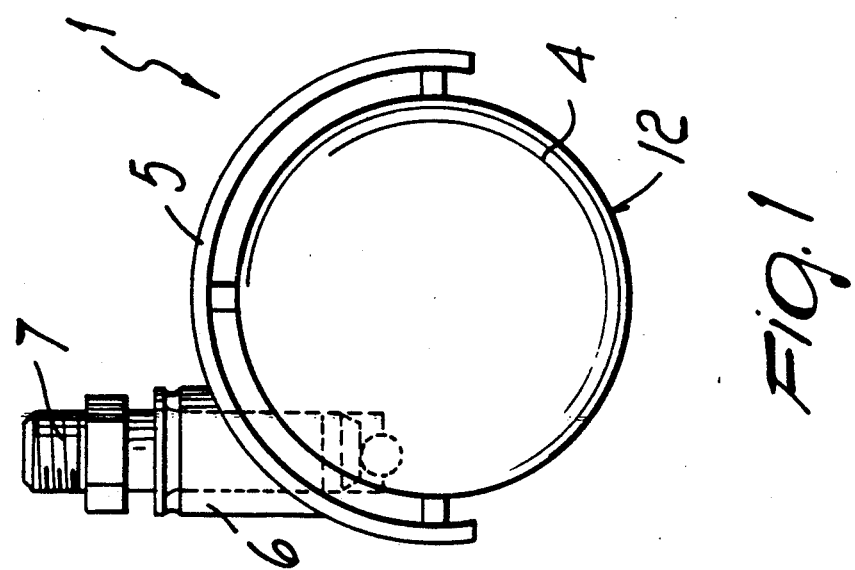
FIG. 1 is a side view of a twin wheel according to the present invention.

With reference to FIGS. 1 and 2, the reference numeral 1 generally indicates the self-orientatable twin wheel which comprises a support composed of a vertical wall 2 which extends between two wheels 3 and 4.

The wheels 3, 4 are covered above by a semi-cylindrical housing 5 rigidly associated with the wall 2.

A well 6 is furthermore provided in the wall 2 and protrudes vertically from the housing 5, acting as a seat for the rotatable support of a pivot 7 which allows the connection of the wheel 1 to a piece of furnuiture (chair, trolley or the like).

Two tubular portions 8 protrude outward from both faces of the wall 2 and are internally provided with teeth 9 for the axial retention of the wheels.

Said tubular portions 8 are coaxial to one another and to a wheel supporting pivot 10 which is driven through the wall 2 and has, at its opposite ends, an annular groove 11.

The wheels 4 have a cambered lateral surface and a cylindrical rolling surface 12.

A tubular portion or tang 13 extends from the cambered surface and has, at one end, an outer collar 14 and defines a dead hole 15 the bottom whereof is constituted by the central portion of the wheel's cambered surface. A space is defined between the inner wall of the tubular portion 13 and the outer one of the pivot 10, and a cylindrical bush 16 is accommodated therein.

Figure 3:
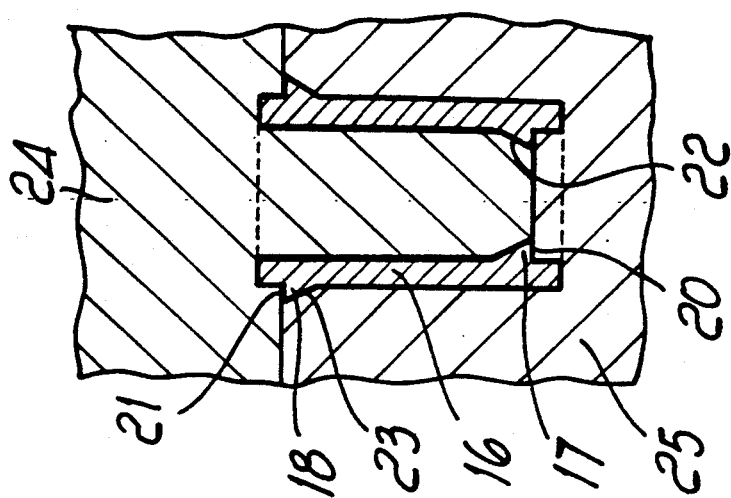
FIG. 3 is a sectional view of the bush used in the wheel of FIG. 2.

The bush 16 has an internal collar 17 and an outer one 18 adjacent to the opposite ends of said bush and adapted to engage in the groove 11 of the pivot 10 and in a groove 19 of the tubular portion 13 respectively. The collars 17, 18 have a saw-tooth cross section with a front surface 20, 21 and an inclined surface 22, 23. The front surfaces are directed toward the opposite ends of the bush 16. It should be noted that the tubular shape of the bush 16 does not require undercuts in the forming die which, as can be seen in FIG. 3, can be constituted by two parts 24, 25 which can be separated from one another at two planes which pass through the ridges of the collars 17, 18. The cross section of the collars is furthermore orientated so as to facilitate the insertion of the bush 16 in the tubular portion 13 and of the pivot 10 in the bush 16 and so as to effectively oppose the extraction of the wheel 4 due to the abutment of the sharp edges of the collars 17, 18 in the grooves 11, 19.

A fundamental prerogative of the present invention is constituted by the mechanical distinction between the part of the wheel 4 which slides on the pivot 10, i.e. the bush 16, and the part which rolls on the plane. This allows to manufacture the bush 16 in wear-resistant material, for example a polyamide resin, and the wheel 4 in shock-resistant material, for example a reinforced copolymer, in particular a polypropylene loaded with rubber. In this manner it is possible to manufacture low-cost, strong wheels, since rubber-loaded polypropylene is much less expensive but nonetheless withstands even low temperatures. Excellent wear resistance is furthermore provided and is ensured by the polyamide bush 16.

It should be furthermore noted that rubber-loaded polypropylene is a softer material than polyamide and therefore allows to achieve quieter rolling.

I claim:

1. Self-orientatable twin wheel comprising a support, a pivot supported by said support, and a pair of wheels mounted on said pivot, each wheel of said wheels being provided with a hollow tang for mounting said each wheel on said pivot, said twin wheel further comprising for said each wheel a bush which is interposed between said tang and said pivot, said bush defining an inner surface facing said pivot and an outer surface facing said tang, said bush defining a first end and a second end, said bush being provided with a first collar protruding internally from its said inner surface at its said first end thereof, said pivot being provided with a pivot groove, said first collar of said bush engaging with said pivot groove of said pivot, said bush being further provided with a second collar protruding externally from its said outer surface at its said second end thereof, said second collar of said bush engaging with a tang groove provided in said tang.

2. Twin wheel according to claim 1, wherein said first collar has a saw-tooth cross section with an inclined surface and a first collar front surface, said first collar front surface being directed away from said second end of said bush, said second collar having a saw-tooth cross section with an inclined surface and a second collar front surface, said second collar front surface being directed away from said first end of said bush.

3. Twin wheel according to claim 1, wherein said each wheel and said tang are made of shock-resistant material.

4. Twin wheel according to claim 1, wherein said bush is made of wear-resistant material.

5. Twin wheel according to claim 3, wherein said shock-resistant material is constituted by rubber-loaded polypropylene.

6. Twin wheel according to claim 4, wherein said wear-resistant material is constituted by a polyamide resin.

7. Self-orientatable twin wheel comprising a support, a pivot supported by said support, and a pair of wheels mounted on said pivot, each wheel of said wheels being provided with a hollow tang for mounting said each wheel on said pivot, said twin wheel further comprising for said each wheel a bush which is interposed between said tang and said pivot, said bush defining an inner surface facing said pivot and an outer surface facing said tang, said bush defining a first end and a second end, said bush being provided with a first collar protruding internally from its said inner surface at its said first end thereof, said pivot being provided with a pivot groove, said first collar of said bush engaging with said pivot groove of said pivot, said bush being further provided with a second collar protruding externally from its said outer surface at its said second end thereof, said second collar engaging with a tang groove provided in said tang, said pivot defining a longituduinal axis, said first collar having a saw-tooth cross section with an inclined surface and a first collar front surface, said first collar front surface being perpendicular to said pivot longitudinal axis and being directed away from said second end of said bush, said second collar having a saw-tooth cross section with an inclined surface and a second collar front surface, said second collar front surface being perpendicular to said pivot longitudinal axis and being directed away from said first end of said bush.

8. Twin wheel according to claim 7, wherein said each wheel and said tang are made of shock-resistant material.

9. Twin wheel according to claim 7, wherein said bush is made of wear-resistant material.

10. Twin wheel according to claim 8, wherein said shock-resistant material is constituted by rubber-loaded polypropylene.

11. Twin wheel according to claim 9, wherein said wear-resistant material is constituted by a polyamide resin.

* * * * *